United States Patent [19]

Hutton et al.

[11] 4,147,850

[45] Apr. 3, 1979

[54] PROCESS FOR INCREASING MOLECULAR WEIGHT OF A POLYMER

[75] Inventors: Thomas W. Hutton, Doylestown; Pamela J. Rogers, North Wales, both of Pa.

[73] Assignee: Rohm and Haas Company, Philadelphia, Pa.

[21] Appl. No.: 798,041

[22] Filed: May 18, 1977

Related U.S. Application Data

[62] Division of Ser. No. 634,816, Nov. 24, 1975, Pat. No. 4,065,523.

[51] Int. Cl.$^2$ .................. C08F 220/14; C08F 220/28
[52] U.S. Cl. ..................................... 526/207; 526/89; 526/206; 526/208; 526/209; 526/210; 526/213; 526/287

[58] Field of Search ................. 526/89, 206, 207, 208, 526/209, 210, 213, 317, 320; 260/79.3 MU

[56] References Cited

U.S. PATENT DOCUMENTS

| 3,067,185 | 12/1962 | DeCoene et al. | 526/197 |
| 3,132,122 | 5/1964 | Dunay et al. | 526/90 |
| 3,734,866 | 5/1973 | Aylies et al. | 526/208 |

Primary Examiner—Harry Wong, Jr.
Attorney, Agent, or Firm—Terence P. Strobaugh; Robert A. Doherty; George W. F. Simmons

[57] ABSTRACT

By conducting solution polymerization in the presence of minor amounts of water, higher molecular weight polymers are obtained.

5 Claims, No Drawings

PROCESS FOR INCREASING MOLECULAR WEIGHT OF A POLYMER

This is a division, of application Ser. No. 634,816 filed Nov. 24, 1975 now U.S. Pat. No. 4,065,523, granted Dec. 27, 1977.

This invention relates to novel polyacrylic hot melt adhesives and to methods for preparing same. Adhesives can be divided into three categories: solvent borne, water borne and 100% solids. Materials in the first two categories must be subjected to a vehicle removal process, subsequent to coating and/or laminating operations. In the case of water borne adhesives, this procedure is uneconomical in terms of energy and time consumption. Solvent borne adhesives are somewhat more economical in this respect requiring less time and energy, however, the solvent removal process presents pollution, fire and explosion hazards. Hot melts are essentially 100% solids adhesives and therefore no vehicle removal operations are necessary. These materials are applied in a molten state and are then cooled rapidly with the aid of a chill roll. Therefore, coating or laminating operations can be conducted at higher speeds with less equipment, lower energy consumption and greater safety than with vehicle borne adhesives.

Most hot melt adhesives (particularly pressure sensitive adhesives) are blends of elastomers with plasticizer and tackifier resins derived from natural rosins. These adhesives generally exhibit poor clarity and deep coloration or both which are undesirable in applications wherein the adhesive will be visible (e.g., transparent laminations). Many of the elastomers employed in these adhesives contain unsaturated chemical bonds (e.g., styrene-butadiene block copolymers), these bonds are vulnerable to attack by oxygen and ultraviolet radiation. This vulnerability contributes to loss of adhesive properties and discoloration on ageing, particularly in outdoor applications.

The term "hot melts" as employed here is meant to include both pressure sensitive adhesives and laminating adhesives. An excellent compendium of hot melt adhesives is contained in the book *Hot Melt Adhesives,* Noyes Data Corporation (1974).

The novel polyacrylic hot melt adhesives of the instant invention require no nonacrylic additives, are only very lightly colored and are substantially insensitive toward oxidation and ultraviolet exposure.

The polyacrylic hot melt adhesives of the invention are compositions comprising a blend of:

A. from 5 to about 95 parts by weight of an addition copolymer having a Tg in the range of from about 0 to about −85° C. comprising:
1. from about 85 to 99.5 parts by weight of a monomer or monomers selected from alkyl ($C_{1-18}$) or alkoxyalkyl acrylate which may also contain minor amounts of alkyl methacrylates, alkoxyalkyl methacrylates, styrene, acrylonitrile, vinyl acetate, vinyl chloride, vinylidene chloride, ethylene, butadiene, isoprene, vinyl ether and the like;
2. from about 0.5 to about 15 parts by weight of an ethylenically unsaturated amine, carboxylic acid or sulfonic acid or mixtures thereof with
B. from about 5 to about 95 parts by weight of an addition copolymer having a Tg in the range of from about 20° to about 150° C. and comprising:
1. from about 85 to about 99.5 parts by weight of a monomer or monomers selected from a monomer of the formula:

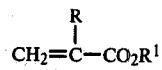

wherein R is hydrogen or methyl and $R^1$ is lower alkyl ($C_{1-5}$), lower cycloalkyl ($C_{5-6}$) or isobornyl, or styrene, acrylonitrile, vinyl acetate, vinyl chloride, vinylidene chloride, ethylene, butadiene, isoprene, vinyl ether and the like and
(2) from about 0.5 to about 15 parts by weight of an ethylenically unsaturated carboxylic or sulfonic acid or an amine or mixtures thereof.

Preferred hot melt adhesive compositions of this invention comprise a blend of:

A. from about 35 to about 90 parts by weight of a copolymer having a Tg in the range of from −20° C. to about −65° C. comprising:
(1) from about 88 to about 98.5 parts by weight of a lower alkyl acrylate ($C_{1-8}$) and
(2) from about 1.5 to about 12 parts by weight of an ethylenically unsaturated acid or amine with
B. from about 10 to about 65 parts by weight of a copolymer having a Tg of 35° C. or more preferably in the range of from about 35° C. to about 110° C. comprising:
(1) from about 88 to 98.5 parts by weight of the monomer of the formula:

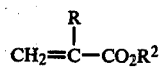

wherein R is hydrogen or methyl and $R^2$ is lower alkyl, lower cycloalkyl or isobornyl and
(2) from about 1.5 to about 12 parts by weight of an ethylenically unsaturated carboxylic acid or amine.

Pressure sensitive adhesives can best be prepared employing from about 15 to about 30 parts by weight of Copolymer B, supra whereas blends containing greater than 30 parts by weight of Copolymer B, supra, are suitable for use as nontacky laminating adhesives.

Especially preferred are compositions comprising a blend of:

A. from about 60 to about 85 parts by weight of a copolymer comprising:
1. from about 94 to 98 parts by weight of a monomer selected from butyl acrylate, 2-ethylhexyl acrylate, methyl acrylate, ethyl acrylate, isobutyl acrylate, isoamyl acrylate or n-propyl acrylate and
2. from about 2 to about 6 parts by weight of dimethylaminoethyl acrylate or methacrylate, diethylaminoethyl acrylate or methacrylate or tert-butylaminoethyl methacrylate with
B. from about 15 to about 40 parts by weight of a copolymer comprising:
1. from about 94 to 98 parts by weight of isobutyl methacrylate, isobornyl acrylate, isobornyl methacrylate, methyl methacrylate and the like and
2. from about 2 to 6 parts by weight of an acid selected from methacrylic acid, acrylic acid or itaconic acid.

The preferred systems are compatible, that is one of the polymers is soluble or substantially soluble in the other polymer. To determine compatibility a 30% solution of the copolymers is prepared in a suitable solvent such as toluene and the like, blended in the desired proportions and spread on a glass plate at a thickness of about 20 mils. The blend is allowed to air dry for one half hour, dried in a 150° C. oven for three hours, allowed to cool and examined visually for clarity. The systems are considered compatible if they form a substantially clear film.

The viscosity of the blends at 177° C. (350° F.) at 100% solids is generally in the range of from about 1,000 to about 1,000,000 cps with the preferred blends having viscosities in the range of from about 1,000 to about 250,00 cps.

Blending is preferred since we have found that forming a single polymer from the same ratios of monomers as in a blend affords very poor if not totally unsuitable hot melt adhesive.

Examples of acrylate monomers which form polymers having low Tgs include the methyl, ethyl, n-propyl, isopropyl, isobutyl, sec-butyl, n-butyl, n-pentyl, 2-ethylhexyl, methoxyethyl and ethoxyethyl acrylates.

Examples of monomers which form polymers having Tgs of 20° to 150° C. include tert-butyl acrylate, cyclohexyl acrylate and methacrylate also included are the methyl, ethyl, n-propyl, i-propyl, n-butyl, i-butyl, sec butyl, tert-butyl, isopentyl, cyclohexyl and isobornyl methacrylates.

The ethylenically unsaturated containing carboxylic acid, sulfonic acid or amine employed in the preparation of the copolymers are monomers having the following formula:

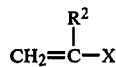

wherein $R^2$ is hydrogen, methyl or carboxy and X is mono- or di-lower alkylamino lower alkoxy carbonyl such as dimethylaminoethoxycarbonyl, diethylaminoethoxycarbonyl, tert-butylaminoethyoxycarbonyl and the like, sulfo lower alkoxycarbonyl such as 2-sulfoethoxycarbonyl and the like, a 5- or 6-membered heterocyclic amine radical such as 2-or 4-pyridyl, 2-quinolyl and the like, carboxy, lower alkoxy carbonylmethyl, such as methoxycarbonylmethyl, ethoxycarbonylmethyl, propoxycarbonylmethyl, butoxycarbonylmethyl and the like or carboxy lower alkyl such as carboxymethyl and the like. While in general either an acid or amine or a mixture thereof will afford adhesives, it is preferred that the copolymers with the high Tgs contain the acid and the copolymers with low Tgs contain the amine.

Examples of the carboxylic acids, sulfonic acids or amines which can be employed include acrylic acid, methacrylic acid, itaconic acid and its alkyl esters such as the methyl, ethyl, propyl, n-butyl esters and the like, 2-sulfoethyl methacrylate, tert-butylaminoethyl methacrylate, dimethylaminoethyl methacrylate, diethylaminoethyl methacrylate, dimethylaminoethyl acrylate, diethylaminoethyl acrylate, 2- or 4-pyridine, 2-vinylquinoline and the like.

The copolymers embodied herein may be prepared by mass (or bulk), emulsion, suspension or solution polymerization techniques. For the purposes of this invention, solution polymerization and especially sequential solution polymerization is preferred because of the superior adhesive properties of the resulting polymer.

It has been found that by conducting solution polymerizations at reflux temperatures in the presence of water, higher molecular weight polymers are obtained. The addition of water to the reaction mixture lowers the reflux temperature of the reaction mixture; slows the rate of decomposition in the initiator employed in the polymerization and because the reaction is conducted at reflux, the oxygen of the air is excluded from the reaction.

The amount of water employed is dependent upon the initiator, solvent, type of monomers employed and concentration of monomers. In general, water is employed in the range of from about 0.1 parts per 100 parts of total monomer employed to about 5.0 parts and, preferably, in the range of from 0.1 to 1.0 parts.

The most preferred procedure is not to add the water in one portion but to add water initially in the range of from about 0.1 to about 0.30 parts with subsequent multiple additions of water in the range of from about 0.01 to about 0.12 parts whenever the reflux temperature begins to exceed the desired reaction temperature.

Solvents which can be employed in these solution polymerizations are, in general, organic solvents which when containing water reflux at a lower temperature than when they are anhydrous. Examples of solvents which can be employed include aromatic hydrocarbons, such as benzene, toluene, xylene, mesitylene and the like; aliphatic hydrocarbons, such as butane, pentane, hexane, heptane, isooctane and the like, ketones, such as methylethyl ketone, methylisobutyl ketone and the like; esters, such as ethyl acetate, propyl acetate, butyl acetate, ethyl propionate and the like; ethers, such as butyl ether, anisole and butoxyethanol; alcohols such as butanol, pentanol and the like; halogenated aliphatic hydrocarbons such as chloroform and the like and mixtures of same.

The preferred procedure is to conduct the polymerization in the solvent toluene at a temperature in the range of from about 112° to about 118° C.

In the preparation of the blends it has been found that in sequential solution polymerizations water can be added to any or all of the copolymerizations. For example, in the preparation of hot melt adhesives, either Copolymer A or Copolymer B can be formed first and that the addition of water at either or both polymerization steps involved causes an increase to the molecular weight of the copolymer. It is preferred, however, to add water to the second monomer mix to form higher molecular weight Copolymer A (Tg = −85° to 0° C.

As polymerization catalyst there may be used one or more peroxides which are known to act as free radical catalysts and which have solubility in aqueous solutions of the emulsifier. Highly convenient are the persulfates, including ammonium, sodium and potassium persulfates or hydrogen peroxide or the perborates or percarbonates. Preferred are the organic peroxides used in solution polymerizations including benzoyl peroxide, tert-butyl hydroperoxide, cumene peroxide, tetralin peroxide, acetyl peroxide, caproyl peroxide, tert-butyl peracetate, tert-butyl perbenzoate, tert-butyl diperpthalate, tert-butyl peroctoate, methylethyl ketone peroxide, tert-butyl perpivalate and the like.

The usual range of catalyst employed is from about 0.01% to about 3% of catalyst with reference to the weight of the monomer mixture. The preferred range is from about 0.02 to about 1.0% with the range of from about 0.05 to about 0.8% being most preferred. The optimum amount of catalyst is determined in large part by the nature of the particular monomers employed including impurities which accompany particular monomers.

These systems, though normally employed as 100% solids, can, if needed, also be applied by dissolving in a suitable solvent including toluene, xylene, acetone, methylethyl ketone, methylisobutyl ketone, halogenated hydrocarbons such as chloroform, dichloroethane and the like. While, in general, no additives are needed, the following may be employed:

adhesive agents, such as colophonium, phenol resins, natural resin, conresin, coumarone-indene resin, resin-ester and hydrated resin derivatives may be incorporated;

fillers and pigments may be added to obtain needed properties. Typical fillers include: powdered quartz, pearl white barium sulfate, light spar (gypsum), chalk and the like and antioxidants, ultraviolet inhibitors, plasticizers and pigments may also be employed.

PREPARATION OF POLYMERS HAVING Tg's OF 0° C. AND LESS

EXAMPLE 1—Copolymer of Butyl acrylate and Methacrylic Acid

A monomer mix is prepared from butyl acrylate (98 parts), methacrylic acid (2 parts), tert-butyl peroctoate (0.1 parts) and hydroxyethyl mercaptan (0.05 parts). To a flask containing toluene (19.3 parts) is added 15 parts of the monomer mix and the contents heated to 110° C. with stirring. The remainder of the monomer mix is added at a constant rate over a three hour period at 110° C. The polymerization mixture is held at 110° C. for 30 minutes and then treated during 30 minutes with a solution prepared from toluene (0.83 parts) and tert-butyl peroctoate (0.2 parts). After the mixture is held at 110° C. for 30 minutes longer and then cooled, there is obtained a solution containing 93.2% by weight of polymer representing a conversion of 100%. The Brookfield Viscosity of the solution at three rpm is 162,000 cps.

By following substantially the procedure of Example 1, the copolymers with a Tg of 0° or less described in Table I are prepared.

TABLE I

| Comonomer - Grams | EXAMPLE NO. | | | | | | |
|---|---|---|---|---|---|---|---|
| | 2 | 3 | 4 | 5 | 6 | 7 | 8 |
| Butyl acrylate | 95.7 | 96.5 | 95 | 95.7 | 75.7 | 92 | 98 |
| tert-Butylaminoethyl methacrylate | 4.3 | — | — | — | 4.3 | 8 | — |
| Methacrylic acid | — | 3.5 | 5 | — | — | — | — |
| Dimethylaminoethyl methacrylate | — | — | — | 4.3 | — | — | — |
| Acrylic acid | — | — | — | — | — | — | 2 |
| 2-Ethylhexyl acrylate | — | — | — | — | 20 | — | — |
| Total Catalyst (percent by wt. of monomers) | 0.1 | 0.2 | 0.1 | 0.1 | 0.1 | 0.1 | 0.1 |
| 2-Hydroxyethyl mercaptan (percent by wt. of monomer) | — | 0.1 | 0.05 | — | — | — | 0.05 |
| Final Solids (percent by wt.) | 81.7 | 83.1 | 82.3 | 81.1 | 82.2 | 81.4 | 71.1[a] |
| Conversion (%) | 98.4 | 100 | 99.4 | 97.7 | 99.0 | 98.1 | 99.8 |
| Brookfield Visc. (cps) | 137,000 | 189,000 | 554,000 | 47,500 | 57,000 | 66,000 | 21,100 |

[a] Diluted with 20 parts toluene

EXAMPLE 9—Copolymer of Butyl acrylate and tert-Butylaminoethyl methacrylate

A solution of toluene (19.3 parts), butyl acrylate (12.4 parts), tert-butylaminoethyl methacrylate (2.58 parts) and 0.10 parts of a 75% solution of tert-butyl perpivalate contained in a flask is heated to 92° C. with stirring for 30 minutes. A monomer mix containing butyl acrylate (70.4 parts), tert-butylaminoethyl methacrylate (14.6 parts) and 0.228 parts of a 75% solution of tert-butyl perpivalate is then added at a constant rate over three hours to the stirred reaction mixture at 92° C. The reaction mixture is maintained at 92° C. for 30 minutes while being diluted with toluene (20 parts). A chaser catalyst of toluene (1.25 parts) and 0.20 parts of a 75% solution of tert-butyl peripvalate is added over 30 minutes; the reaction mixture is held at 92° C. for 30 minutes following which it is cooled to afford a solution containing 67.0% by weight of a polymer representing a conversion of 94.5% of the theoretical. The Brookfield viscosity of the solution at six rpm is 13,400 cps.

By following substantially the procedure as described in Example 9, the following soft polymers described in Table II are prepared.

TABLE II

| Comonomer - Grams | EXAMPLE NO. | | | | | |
|---|---|---|---|---|---|---|
| | 10 | 11 | 12 | 13 | 14 | 15 |
| Butyl acrylate | 90.2 | 86.8 | 91.6 | 88.6 | 85 | 97.5 |
| tert-Butylaminoethyl methacrylate | 9.8 | 13.2 | — | — | — | 2.5 |
| Dimethylaminoethyl methacrylate | — | — | 8.4 | 11.4 | 15 | — |
| Final Solids (% by wt.) | 68.4 | 68.4 | 69.0 | 67.7 | 73.0[b] | 69.1 |
| Conversion (%) | 97.5 | 96.6 | 96.2 | 95.5 | 95.7 | 97.4 |
| Brookfield Visc. (cps) | 12,600 | 13,500 | 6,750 | 6,200 | 17,500 | 17,000 |

| Comonomer - Grams | EXAMPLE NO. | | | | | |
|---|---|---|---|---|---|---|
| | 16 | 17 | 18 | 19 | 20 | 21 | 22 |
| Butyl acrylate | 55.7 | 75.7 | 68 | 80.7 | 48 | — | — |
| 2-Ethylhexyl acrylate | 40 | 20 | — | — | — | — | — |

TABLE II-continued

| | | | | | | | |
|---|---|---|---|---|---|---|---|
| Ethyl acrylate | | | 27.7 | — | — | — | — |
| Methyl acrylate | | | | 15 | — | — | — |
| Isobutyl acrylate | | | | | 47.7 | — | — |
| Isoamyl acrylate | | | | | | 95.7 | — |
| n-Propyl acrylate | | | | | | | 95.7 |
| tert-Butylaminoethyl methacrylate | 4.3 | 4.3 | 4.3 | 4.3 | 4.3 | 4.3 | 4.3 |
| Final Solids (% by wt.) | 72.7 | 72.8 | 69.8 | 68.2 | 75.5 | 68.4 | 68.2 |
| Conversion (%) | 97.8 | 98.0 | 98.5 | 96.2 | 96.5 | 98.0 | 97.7 |
| Brookfield Viscosity (cps) | 17,700 | 27,150 | 29,750 | 78,500 | 78,500 | 11,200 | 17,500 |

[a]Chaser catalysts amounted to 0.4 parts
[b]Diluted with only 10 parts toluene

PREPARATION OF POLYMERS HAVING Tg's OF 20° to 150° C.

EXAMPLE 23—Isobutyl methacrylate and Methacrylic Acid

A monomer mixture is prepared from isobutyl methacrylate (96.3 parts) and methacrylic acid (3.7 parts). A catalyst solution is prepared from xylene (11.8 parts) and tert-butyl peroctoate (1.10 parts). To a flask equipped with a stirrer is added xylene (30.1 parts), 15.1 parts monomer mix and 1.4 parts catalyst solution. The contents are heated to 115° C. at which point the remaining monomer solution and 7.96 parts catalyst solution are added at a constant rate over a two hour period with the reaction mixture maintained at 115° C. The remainder of the catalyst solution is added at a uniform rate over 30 minutes. After an additional 15 minutes at 115° C., the reaction mixture is cooled and diluted with xylene (72 parts) to afford a solution containing 45.6% by weight of polymer representing a conversion of 98.2% of the theoretical. The Brookfield viscosity of the solution at 30 rpm is 13,440 cps.

By following substantially the procedure of Example 23, the products described in Table III are prepared.

EXAMPLE 38—Isobutyl methacrylate (96.3) - Itaconic Acid (3.7)

To a flask equipped with a stirrer is added 2-methoxyethanol (12.3 parts), toluene (27.4 parts) and itaconic acid (3.7 parts). The contents are heated to reflux and a monomer mix containing isobutyl methacrylate (96.3 parts), toluene (9.58 parts) and tert-butyl peroctoate (0.93 parts) are added at a constant rate over three hours. The reaction mixtures are held at reflux for 15 minutes, treated over a period of one hour with a solution of toluene (5.5 parts) and tert-butyl peroctoate (0.93 parts), diluted with toluene (10.5 parts) and then cooled to afford a polymer solution containing 59.4% by weight of polymer representing a conversion of 98.9% of the theoretical. The Brookfield viscosity of the solution at 30 rpm is 11,500 cps.

BLENDING OF THE COPOLYMERS TO FORM HOT MELT ADHESIVES

The polymers of Examples 1–23 and the polymers of Examples 23–38 are blended to afford compatible mixtures exhibiting hot melt adhesive properties. The blending is accomplished by removing solvent from each polymer at 150°–175° C. and 5–10 tor. The required quantities of the individual polymers are

TABLE III

| Comonomer - grams | EXAMPLE NO. | | | | | | | | | | |
|---|---|---|---|---|---|---|---|---|---|---|---|
| | 24 | 25 | 26 | 27 | 28 | 29 | 30 | 31 | 32 | 33 | 34 |
| Isobutyl methacrylate | | 98 | 94 | 90 | 99.5 | 98.5 | 97 | | | | 96.9 |
| tert-Butylaminoethyl methacrylate | 3.0 | | | | | | | 3.0 | | | |
| Methacrylic acid | | 2.0 | 6.0 | 10 | | | | | 2.0 | 3.7 | 5 |
| Acrylic acid | | | | | | | | | | | 3.1 |
| 2-Sulfoethyl methacrylate | | | | | 0.5 | 1.5 | | | | | |
| Methyl methacrylate | | | | | | | | | 28 | 27.3 | 27 |
| Butyl methacrylate | 97 | — | — | — | — | — | — | | 70 | 69 | 68 |
| Total catalyst (% by wt. of monomers) | 1.1 | 1.1 | 1.1 | 2.2 | 1.1 | 1.1 | 1.1 | 1.1 | 1.1 | 2.2 | 1.1 |
| Final Solids (% by wt.) | 45.0 | 45.5 | 46.8 | 49.5 | 45.7 | 45.4 | 45.2 | 45.2 | 45.2 | 45.1 | 45.5 |
| Conversion (%) | 96.9 | 97.9 | 100 | 100 | 98.3 | 97.6 | 97 | 97.2 | 97.3 | 97.1 | 97.9 |
| Brookfield Visc. (cps) | | 4070 | 400,000 | — | 545 | 595 | 5600 | 3160 | 18,100 | 530,000 | 4400 |

| Comonomer - grams | EXAMPLE NO. | | |
|---|---|---|---|
| | 35 | 36 | 37 |
| Butyl methacrylate | 76.3 | — | — |
| Isobornyl methacrylate | 20 | 20 | — |
| Isobutyl methacrylate | | 76.3 | 76.3 |
| Methyl methacrylate | | | 20 |
| Methacrylic acid | 3.7 | 3.7 | 3.7 |
| Total Catalyst (% by wt. of monomers) | 1.9 | 1.1 | 1.9 |
| Final Solids (% by wt.) | 44.6 | 45.0 | 45.8 |
| Conversion (%) | 96.3 | 96.9 | 98.9 |
| Brookfield Viscosity (cps) | 2420 | — | 7200 | weighed into a beaker, heated to 175° C. and blended to afford the hot melt adhesives of Table IV.

TABLE IV

| Blend | Polymers of Example No. | Polymers of Example No. | Parts by weight of Polymers of Examples 23-38 Per 100 Parts of Mixture |
|---|---|---|---|
| 39 | 23 | 2 | 15 |
| 40 | " | 2 | 20 |
| 41 | " | 2 | 25 |
| 42 | " | 2 | 30 |
| 43 | " | 2 | 35 |
| 44 | " | 2 | 40 |
| 45 | " | 15 | 20 |
| 46 | " | 15 | 25 |
| 47 | " | 15 | 30 |
| 48 | " | 15 | 35 |
| 49 | " | 5 | 30 |
| 50 | " | 5 | 35 |
| 51 | " | 5 | 40 |
| 52 | " | 6 | 30 |
| 53 | " | 6 | 35 |
| 54 | " | 6 | 40 |
| 55 | " | 7 | 30 |
| 56 | " | 7 | 40 |
| 57 | " | 1 | 25 |
| 58 | " | 1 | 30 |
| 59 | " | 1 | 35 |
| 60 | " | 1 | 40 |
| 61 | 24 | 1 | 40 |
| 62 | " | 1 | 50 |
| 63 | " | 1 | 60 |
| 64 | " | 1 | 70 |
| 65 | " | 8 | 35 |
| 66 | 25 | 2 | 30 |
| 67 | " | 2 | 35 |
| 68 | " | 2 | 40 |
| 69 | " | 5 | 30 |
| 70 | " | 5 | 35 |
| 71 | " | 5 | 40 |
| 72 | " | 6 | 30 |
| 73 | " | 6 | 35 |
| 74 | " | 6 | 40 |
| 75 | " | 7 | 30 |
| 76 | " | 7 | 35 |
| 77 | " | 7 | 40 |
| 78 | 26 | 2 | 30 |
| 79 | " | 2 | 35 |
| 80 | " | 2 | 40 |
| 81 | " | 5 | 30 |
| 82 | " | 5 | 35 |
| 83 | " | 5 | 40 |
| 84 | " | 7 | 30 |
| 85 | " | 7 | 35 |
| 86 | " | 7 | 40 |
| 87 | 27 | 5 | 30 |
| 88 | " | 5 | 35 |
| 89 | " | 5 | 40 |
| 90 | " | 7 | 30 |
| 91 | " | 7 | 35 |
| 92 | " | 7 | 40 |
| 93 | 28 | 2 | 30 |
| 94 | " | 2 | 35 |
| 95 | " | 2 | 40 |
| 96 | " | 5 | 30 |
| 97 | " | 5 | 35 |
| 98 | " | 5 | 40 |
| 99 | " | 6 | 30 |
| 100 | " | 6 | 35 |
| 101 | " | 6 | 40 |
| 102 | " | 7 | 30 |
| 103 | " | 7 | 35 |
| 104 | " | 7 | 40 |
| 105 | 29 | 5 | 30 |
| 106 | " | 5 | 35 |
| 107 | " | 5 | 40 |
| 108 | " | 2 | 30 |
| 109 | " | 2 | 35 |
| 110 | " | 2 | 40 |
| 111 | " | 7 | 30 |
| 112 | " | 7 | 35 |
| 113 | " | 7 | 40 |
| 114 | 30 | 1 | 25 |
| 115 | " | 1 | 30 |
| 116 | " | 1 | 35 |
| 117 | " | 1 | 40 |
| 118 | " | 2 | 25 |
| 119 | 30 | 2 | 30 |
| 120 | " | 2 | 35 |
| 121 | " | 2 | 40 |
| 122 | " | 3 | 10 |
| 123 | " | 3 | 20 |
| 124 | " | 5 | 10 |
| 125 | " | 4 | 20 |
| 126 | " | 4 | 25 |
| 127 | " | 4 | 30 |
| 128 | " | 8 | 35 |
| 129 | 31 | 10 | 25 |
| 130 | " | 10 | 30 |
| 131 | " | 10 | 35 |
| 132 | " | 11 | 25 |
| 133 | " | 11 | 30 |
| 134 | " | 11 | 35 |
| 135 | " | 9 | 30 |
| 136 | " | 9 | 30 |
| 137 | " | 9 | 35 |
| 138 | " | 12 | 25 |
| 139 | " | 12 | 30 |
| 140 | " | 12 | 35 |
| 141 | " | 13 | 25 |
| 142 | " | 13 | 30 |
| 143 | " | 13 | 35 |
| 144 | " | 14 | 25 |
| 145 | 31 | 14 | 30 |
| 146 | " | 14 | 35 |
| 147 | 32 | 10 | 25 |
| 148 | " | 10 | 30 |
| 149 | " | 10 | 35 |
| 150 | " | 11 | 25 |
| 151 | " | 11 | 30 |
| 152 | " | 11 | 35 |
| 153 | " | 9 | 25 |
| 154 | " | 9 | 30 |
| 155 | " | 9 | 35 |
| 156 | " | 12 | 25 |
| 157 | " | 12 | 30 |
| 158 | " | 12 | 35 |
| 159 | " | 13 | 25 |
| 160 | " | 13 | 30 |
| 161 | " | 13 | 35 |
| 162 | " | 14 | 25 |
| 163 | " | 14 | 30 |
| 164 | " | 14 | 35 |
| 165 | 33 | 10 | 25 |
| 166 | " | 10 | 30 |
| 167 | " | 10 | 35 |
| 168 | " | 11 | 25 |
| 169 | " | 11 | 30 |
| 170 | " | 11 | 35 |
| 171 | " | 9 | 25 |
| 172 | 33 | 9 | 30 |
| 173 | " | 9 | 35 |
| 174 | " | 12 | 25 |
| 175 | " | 12 | 30 |
| 176 | " | 12 | 30 |
| 177 | " | 13 | 25 |
| 178 | " | 13 | 30 |
| 179 | " | 13 | 35 |
| 180 | " | 14 | 25 |
| 181 | " | 14 | 30 |
| 182 | " | 14 | 35 |
| 183 | 34 | 2 | 25 |
| 184 | " | 2 | 30 |
| 185 | " | 2 | 35 |
| 186 | " | 2 | 40 |
| 187 | 38 | 2 | 20 |
| 188 | " | 2 | 25 |
| 189 | " | 2 | 30 |
| 190 | " | 2 | 35 |

TABLE IV-continued

| Blend | Polymers of Example No. | Polymers of Example No. | Parts by weight of Polymers of Examples 23-38 Per 100 Parts of Mixture |
|---|---|---|---|
| 191 | 23 | 16 | 20 |
| 192 | " | 16 | 25 |
| 193 | " | 16 | 30 |
| 194 | " | 16 | 35 |
| 195 | " | 16 | 40 |
| 196 | " | 17 | 20 |
| 197 | " | 17 | 25 |
| 198 | " | 17 | 30 |
| 199 | 23 | 17 | 35 |
| 200 | " | 17 | 40 |
| 201 | " | 18 | 20 |
| 202 | " | 18 | 25 |
| 203 | " | 18 | 30 |
| 204 | " | 18 | 35 |
| 205 | " | 18 | 40 |
| 206 | " | 19 | 20 |
| 207 | " | 19 | 25 |
| 208 | " | 19 | 30 |
| 209 | " | 19 | 35 |
| 210 | " | 19 | 40 |
| 211 | " | 20 | 15 |
| 212 | " | 20 | 20 |
| 213 | " | 20 | 25 |
| 214 | " | 20 | 30 |
| 215 | " | 20 | 35 |
| 216 | " | 21 | 20 |
| 217 | " | 21 | 25 |
| 218 | " | 21 | 30 |
| 219 | " | 21 | 35 |
| 220 | " | 21 | 40 |
| 221 | 35 | 17 | 20 |
| 222 | " | 17 | 25 |
| 223 | " | 17 | 30 |
| 224 | " | 17 | 35 |
| 225 | " | 17 | 40 |
| 226 | 36 | 17 | 20 |
| 227 | 36 | 17 | 25 |
| 228 | " | 17 | 30 |
| 229 | " | 17 | 35 |
| 230 | " | 21 | 15 |
| 231 | " | 21 | 20 |
| 232 | " | 21 | 25 |
| 233 | " | 21 | 30 |
| 234 | " | 21 | 35 |
| 235 | 37 | 18 | 20 |
| 236 | " | 18 | 25 |
| 237 | " | 18 | 30 |
| 238 | " | 18 | 35 |
| 239 | " | 18 | 40 |
| 240 | " | 19 | 15 |
| 241 | " | 19 | 20 |
| 242 | " | 19 | 25 |
| 243 | " | 19 | 30 |
| 244 | " | 19 | 35 |
| 245 | " | 22 | 15 |
| 246 | " | 22 | 20 |
| 247 | " | 22 | 25 |
| 248 | " | 22 | 30 |
| 249 | " | 22 | 35 |
| 250 | " | 20 | 15 |
| 251 | " | 20 | 20 |
| 252 | " | 20 | 25 |
| 253 | " | 20 | 30 |
| 254 | " | 20 | 35 |

BLENDING BY SEQUENTIAL SOLUTION POLYMERIZATION

The blends may also be prepared by a sequential solution polymerization of the monomer composition required for each phase. The low Tg monomers may be polymerized first, followed by polymerization of the high Tg monomers, as illustrated by Example I or the high Tg polymers and then the low Tg monomers may be polymerized as illustrated by Examples II through XII. The preferred method is the latter. Blends prepared by sequential polymerization of each phase have performance equivalent or superior to blends of the separately prepared polymers.

Example I illustrates the sequential polymerization in which the soft phase is prepared first followed by the hard phase. The soft phase, butyl acrylate/tert-butylaminoethyl methacrylate = 95.7/4.3, to hard phase, isobutyl methacrylate (IBMA)/methacrylic acid (MAA) = 96.3/3.7, ratio is 72.5/27.5.

EXAMPLE I

A flask containing toluene (5.35 parts), butyl acrylate (10.4 parts), and tert-butylaminoethyl methacrylate (0.47 parts) is heated until the contents attain 105° C. when tert-butyl peroctoate (0.012 parts dissolved in toluene 0.70 parts) is added. The solution is brought to reflux and held at reflux for forty minutes. A soft phase monomer mix prepared from butylacrylate (59.0 parts), tert-butylaminoethyl methacrylate (2.65 parts), tert-butyl peroctoate (0.031 parts) and toluene (2.08 parts) is added at a uniform rate over 105 minutes to the flask contents at reflux. Following a 15 minute hold period a chaser catalyst composed of 75% tert-butyl peracetate (0.19 parts) and toluene (0.59 parts) is added over a 45 minute period. The mixture is held at reflux (15 minutes), diluted with toluene (1.24 parts). A hard phase monomer mix containing isobutyl methacrylate (26.5 parts), methacrylic acid (1.02 parts), toluene (3.58 parts) and 75% tert-butyl peracetate (0.076 parts) is prepared and added at a uniform rate to the reaction mixture over a 50 minute period. Following a 15 minute hold period a chaser solution at 75% tert-butyl peracetate (0.37 parts) and toluene (2.1 parts) is added at a uniform rate over 95 minutes. After a 15 minute hold period the solution is cooled and it is found to contain 83.1% solids (96.6% overall conversion) and to have a viscosity of 210,000 cps at 53° C. The polymer blend is stripped of solvent on a flask-evaporator at 175° C. and 5-10 torr.

Examples II through VII illustrate the sequential polymerization in which the hard phase is prepared first followed by the soft phase.

EXAMPLE II

A hard phase monomer mix is prepared from isobutyl methacrylate (26.5 parts), methacrylic acid (1.01 parts), toluene (0.98 parts) and tert-butyl peroctoate (0.45 parts). To a flask containing toluene (7.50 parts) is added 19.1% of the monomer mix and the contents are heated to reflux (113° C.). Fifteen minutes later the addition of the remaining monomer mix is started and continued at a constant rate over 40 minutes while the flask contents are stirred at reflux. The mixture is held at reflux for 15 minutes and then treated during 30 minutes with the addition at a uniform rate of a solution prepared from toluene (1.33 parts) and tert-butyl peroctoate (0.048 parts). The solution is held at reflux for 15 minutes (122° C.) and then a soft phase monomer mix is prepared from toluene (4.20 parts), butyl acrylate (69.39 parts), tert-butylaminoethyl methacrylate (3.11 parts) and 75% tert-butyl peracetate (0.049 parts) is added over 100 minutes at a uniform rate while keeping the flask contents at reflux. During the addition, the reaction temperature increases from 122° to 139° C. The reaction mixture is held at reflux for 15 minutes and then treated by the uniform addition over 60 minutes of a solution containing toluene (2.84 parts) and 75% tert-butyl peracetate (0.20 parts). After the mixture is held at reflux for 15 minutes longer and then cooled, there is obtained a solution containing 85.5% by weight of polymer representing a conversion of 100%. The product is concentrated on a flash evaporator at 175° C. and 3-5 torr. to a nominally 100% solids, highly viscous liquid.

By following substantially the process of Example II the sequentially polymerized hard soft copolymer blends of Examples III through VII are prepared, see Table V. Except for Example VII all of the Examples of Table V have the same hard and soft phase composition of Example II.

TABLE V

| Example No. | Parts of Hard Polymer per 100 Parts of Total Monomer | Conversion (%) | Viscosity at 100% solids and 177° C. (cps) |
|---|---|---|---|
| III | 20 | 100 | 4200 |
| IV | 25 | 99.7 | 6900 |
| V | 22.5 | 100 | 4000 |
| VI | 38.4 | — | — |
| VII | 20[1] | 99.8 | 5100 |

[1]Hard phase composition: IBMA/MAA = 94.8/5.2

Example VIII illustrates the sequential polymerization in which the hard phase is prepared first followed by the soft phase; however, during the polymerization of the soft phase, water is added to reduce the reaction temperature with the result that a higher molecular weight soft phase is formed.

EXAMPLE VIII

A hard phase monomer mix is prepared from isobutyl methacrylate (19.26 parts), methacrylic acid (0.74 parts), toluene (0.72 parts), and tert-butyl peroctoate (0.16 parts). To a flask containing toluene (8.18 parts) is added 28.7% of the monomer mix and the contents are heated to reflux (115° C.). Fifteen minutes later the addition of the remaining monomer mix is started and continued at a uniform rate over 40 minutes while the flask contents are stirred at reflux. The mixture is held at reflux for 15 minutes and then treated during 30 minutes with the addition at a constant rate of a solution prepared from toluene (1.34 parts) and tert-butyl peroctoate (0.034 parts). The solution is held at reflux for 15 minutes (120° C.) then treated with water (0.24 parts) which reduced the reflux temperature to 107° C. A soft phase monomer mix containing butyl acrylate (76.56 parts), tert-butylaminoethyl methacrylate (3.44 parts), 75% tert-butyl peracetate (0.054 parts) and toluene (3.52 parts) is fed at a constant rate over the next 100 minutes. During the addition, the reaction temperature increases from 107° to 129° C. The reaction mixture is held at reflux for 15 minutes and then treated with a solution of 75% tert-butyl peracetate (0.054 parts) and toluene (2.84 parts) which is added at a uniform rate over 60 minutes. The mixture is held for 15 minutes at reflux, diluted with toluene (23.9 parts) and the water removed as a toluene azeotrope. Toluene (40.85 parts) is used to dilute the polymer which is present as a 55.3% solution (100% conversion) with a Brookfield Viscosity of 33,000 cps. The product is concentrated with a flask evaporator at 175° C. and 3-5 torr is a nominally 100% solids, highly viscous liquid with a viscosity of 13,200 cps (Brookfield NBT Viscometer, spindle 27, 20 rpm at 177° C.).

Examples IX through XIX of Table VI are prepared by substantially the process of Example VIII. With the exception of Example XIX, the composition of the hard and soft phases is as in Example VIII. The Examples differ in the amount of hard phase and/or the molecular weight of the hard of soft phase. The molecular weight of the hard phase is altered by changing the initiator level; the molecular weight of the soft phase is controlled by adjusting the polymerization temperature with added water: (1) with no water (Condition A) the polymerization temperature ranged from 117°–139° C.; (2) with 0.24 parts of water per 100 parts total monomer added prior to the start of the soft phase monomer addition (Condition B) the polymerization temperature ranged from 105°–130° C.; (3) with water added as in Condition B and then whenever the polymerization temperature rises to 115° C., 0.08 parts of water are added (Condition C).

TABLE VI

| Example No. | Parts of High Tg Polymer per 100 Parts of Total Polymer | Percent of Hard Phase Initiator based on hard phase wt.) | Soft Phase Water Condition[1] | Conversion (%) | Final Solids (%) | Viscosity (cps) at Final Solids | Viscosity at 100% solids and 177° C. (cps) |
|---|---|---|---|---|---|---|---|
| IX | 20 | 0.8 | B | 99.7 | 60.2 | 81,800 | 17,300 |
| X | 20 | 0.8 | C | 99.9 | 55.2 | 131,000 | 48,000 |
| XI | 20 | 1.2 | C | 100 | 55.3 | 93,600 | 43,000 |
| XII | 20 | 0.4 | A | 98.5 | 54.2 | 21,800 | 7,000 |
| XIII | 20 | 0.4 | B | 100 | 55.2 | 60,500 | 22,000 |
| XIV | 20 | 0.8 | A | 100 | 55.0 | 13,100 | 5,200 |
| XV | 18 | 0.8 | C | 100 | 55.5 | 147,000 | 40,700[3] |
| XVI | 18 | 0.4 | B | 100 | 55.5 | 47,000 | 22,800 |
| XVII | 18 | 0.4 | A | 100 | 55.2 | 21,300 | 7,600 |
| XVIII | 15 | 0.8 | C | 99.8 | 55.3 | — | 44,200 |
| XIX[2] | 20 | 0.4 | B | 100 | 55.2 | 122,000 | 24,700 |

[1]Condition A: no water; Condition B: 0.24 parts water; Condition C:0.24 parts water plus water to keep temperature under 115° C.
[2]Hard phase composition: IBMA/MMA = 94.8/5.2.
[3]Best for pressure sensitive adhesive.

EXAMPLE XX—Sequential Polymerization - Water Added to First Copolymerization.

A flask containing toluene (76.0 g.), isobutyl methacrylate (51.4 g.) and methacrylic acid (1.96 g.) is heated to 105° C. and treated with toluene (5.0 g.) and tert-butyl peroctoate (0.85 g.). The reaction mixture is brought to reflux (115° C.) and held there for 15 minutes. Water (4.0 ml.) is added to decrease the reflux temperature to 100° C. A solution of toluene (5.0 g.) isobutyl methacrylate (217.0 g.), methacrylic acid (8.3 g.) and tert-butyl peroctoate (3.6 g.) is then added at a uniform rate over a 45 minute period. The final temperature is 110° C. More toluene (10 g.) is added. The reaction mixture is maintained at reflux for an additional 15 minutes and then treated over a 30 minute period with a solution of toluene (8.6 g.) and tert-butyl peroctoate (0.48 g.). The reaction mixture is then refluxed for 15 minutes at 106° C. A soft phase monomer mix prepared from toluene (87.0 g.), butyl acrylate (1067.0 g.), tert-butylaminoethyl methacrylate (48 g.) and tert-butyl peracetate (0.75 g.; 75%) is fed at a constant rate over a 100 minute period. During this addition, the reflux temperature increases to 130° C. Toluene (10 g.) is added. Reflux is maintained for 15 minutes and then a catalyst solution of tert-butyl peracetate (3.0 g.; 75%) in toluene (28.6 g.) is added at a constant rate over a 60 minute period. The reaction mixture is refluxed for an additional 15 minutes and then water (3 ml.) and toluene (19.6 g.) are removed by azeotropic distillation. The final solids of 86.5% indicates 100% conversion of monomers. The solvent is removed with a flash-evaporator at 175° C. at 3 to 5 torr. to a nominally 100% solids liquid with a viscosity of 16,600 cps (Brookfield NBT Viscometer, Spindle 27, 20 rpm at 177° C.).

What is claimed is:

1. A process of preparing an addition copolymer of increased molecular weight comprising the steps of copolymerizing by gradual addition, free-radical solution polymerization in an organic solvent at reflux temperature in the presence of 0.1 to 5 parts of water per 100 parts of monomers, the monomers consisting essentially of
   (1) from about 85 to about 99.5 parts by weight of a monomer or monomers selected from alkyl ($C_{2-18}$) or alkoxyalkyl acrylate, and
   (2) from about 0.5 to about 15 parts by weight of an ethylenically unsaturated amine, carboxylic acid, sulfonic acid, or mixtures thereof, said monomers being such as to obtain said addition copolymer as one having a $T_g$ in the range of from 0° to -85° C., and recovering said copolymer.

2. A process of preparing an addition copolymer of increased molecular weight comprising the steps of copolymerizing by gradual addition, free-radical solution polymerization in an organic solvent at reflux temperature, in the presence of 0.1 to 5 parts of water per 100 parts of monomers, the monomers consisting essentially of
   (1) from about 85 to about 99.5 parts by weight of a monomer or monomers of the formula:

$$CH_2\!=\!\underset{\underset{R}{|}}{C}\!-\!CO_2R^1$$

wherein R is hydrogen or methyl and $R^1$ is lower alkyl, lower cycloalkyl or isobornyl and
   (2) from about 0.5 to about 15 parts by weight of an ethylenically unsaturated amine, carboxylic acid or sulfonic acid or mixtures thereof,
said monomers being such as to obtain said addition copolymer as one having a $T_g$ in the range of from about 20° to 150° C., and recovering said copolymer.

3. The process of claim 1 in which the solvent is a hydrocarbon liquid.

4. The process of claim 2 in which the solvent is a hydrocarbon liquid.

5. The process of claim 4 in which (2) is an ethylenically unsaturated carboxylic acid.

* * * * *